United States Patent
Doddapaneni

(10) Patent No.: US 9,350,762 B2
(45) Date of Patent: May 24, 2016

(54) INTELLIGENT FEEDBACK LOOP TO ITERATIVELY REDUCE INCOMING NETWORK DATA FOR ANALYSIS

(71) Applicant: Ashok Babu Doddapaneni, Fremont, CA (US)

(72) Inventor: Ashok Babu Doddapaneni, Fremont, CA (US)

(73) Assignee: SS8 NETWORKS, INC., Milpitas, CA (US)

( * ) Notice: Subject to any disclaimer, the term of this patent is extended or adjusted under 35 U.S.C. 154(b) by 213 days.

(21) Appl. No.: 13/626,367

(22) Filed: Sep. 25, 2012

(65) Prior Publication Data

US 2014/0086102 A1    Mar. 27, 2014

(51) Int. Cl.
*H04L 12/26*    (2006.01)
*H04L 29/06*    (2006.01)

(52) U.S. Cl.
CPC ............ *H04L 63/30* (2013.01); *H04L 63/1416* (2013.01)

(58) Field of Classification Search
CPC ..... H04W 12/02; H04L 37/22; H04L 63/304; H04L 63/30; H04M 3/2281; G06F 11/34
USPC ........................................................ 709/224
See application file for complete search history.

(56) References Cited

U.S. PATENT DOCUMENTS

| | | |
|---|---|---|
| 5,185,860 A | 2/1993 | Wu |
| 5,444,850 A | 8/1995 | Chang |
| 5,475,819 A | 12/1995 | Miller et al. |
| 5,675,741 A | 10/1997 | Aggarwal et al. |
| 5,796,952 A | 8/1998 | Davis et al. |
| 5,835,720 A | 11/1998 | Nelson et al. |
| 5,878,384 A | 3/1999 | Johnson et al. |
| 5,944,790 A | 8/1999 | Levy |
| 5,954,797 A | 9/1999 | Sidey |
| 5,958,010 A | 9/1999 | Agarwal et al. |
| 5,987,430 A | 11/1999 | Van Horne et al. |
| 5,996,011 A | 11/1999 | Humes |
| 6,006,260 A | 12/1999 | Barrick, Jr. et al. |

(Continued)

FOREIGN PATENT DOCUMENTS

JP    2001077357 A    3/2001

OTHER PUBLICATIONS

"Visualizing criminal relationships: comparison of a hyperbolic tree and a hierarchical list", by Yang Xiang et al., Jul. 14, 2005 (pp. 15) http://ai.arizona.edu/intranet/papers/VisualizingCriminalRelationships.pdf.

(Continued)

*Primary Examiner* — Ahmed Elallam
(74) *Attorney, Agent, or Firm* — Raj Abhyanker, P.C.

(57) ABSTRACT

A method, apparatus and system related to an intelligent feedback loop to iteratively reduce target packet analysis is disclosed. According to one embodiment, a method of a network traffic monitoring system includes processing a flow data received through an aggregation switch of a network traffic monitoring system in a first stage module of the network traffic monitoring system, filtering the flow data to a target data based on a packet classification in the first stage module, determining that a portion of a target data is an extraneous data based on a content filtering algorithm applied in a data processing system of the network traffic monitoring system, and iteratively removing from the target data the extraneous data based on a feedback loop created between the data processing system and the first stage module of the network traffic monitoring system.

18 Claims, 11 Drawing Sheets

(56) References Cited

U.S. PATENT DOCUMENTS

| | | |
|---|---|---|
| 6,012,088 A | 1/2000 | Li et al. |
| 6,055,542 A | 4/2000 | Nielsen et al. |
| 6,112,240 A | 8/2000 | Pogue et al. |
| 6,115,742 A | 9/2000 | Franklin et al. |
| 6,134,592 A | 10/2000 | Montulli |
| 6,148,342 A | 11/2000 | Ho |
| 6,151,631 A | 11/2000 | Ansell et al. |
| 6,182,075 B1 | 1/2001 | Hsu |
| 6,289,341 B1 | 9/2001 | Barney |
| 6,314,460 B1 | 11/2001 | Knight et al. |
| 6,317,792 B1 | 11/2001 | Mundy et al. |
| 6,321,336 B1 | 11/2001 | Applegate et al. |
| 6,321,338 B1 | 11/2001 | Porras et al. |
| 6,327,619 B1 | 12/2001 | Blumenau |
| 6,359,557 B2 | 3/2002 | Bilder |
| 6,373,838 B1 | 4/2002 | Law et al. |
| 6,377,987 B1 | 4/2002 | Kracht |
| 6,393,461 B1 | 5/2002 | Okada et al. |
| 6,393,479 B1 | 5/2002 | Glommen et al. |
| 6,404,860 B1 | 6/2002 | Casellini |
| 6,425,007 B1 | 7/2002 | Messinger |
| 6,442,590 B1 | 8/2002 | Inala et al. |
| 6,449,604 B1 | 9/2002 | Hansen et al. |
| 6,466,981 B1 | 10/2002 | Levy |
| 6,466,984 B1 | 10/2002 | Naveh et al. |
| 6,470,386 B1 | 10/2002 | Combar et al. |
| 6,516,345 B1 | 2/2003 | Kracht |
| 6,564,261 B1 | 5/2003 | Gudjonsson et al. |
| 6,591,251 B1 | 7/2003 | Leon et al. |
| 6,658,465 B1 | 12/2003 | Touboul |
| 6,665,715 B1 | 12/2003 | Houri |
| 6,678,720 B1 | 1/2004 | Matsumoto et al. |
| 6,714,977 B1 | 3/2004 | Fowler et al. |
| 6,721,726 B1 | 4/2004 | Swaminathan et al. |
| 6,725,377 B1 | 4/2004 | Kouznetsov |
| 6,760,761 B1 | 7/2004 | Sciacca |
| 6,782,421 B1 | 8/2004 | Soles et al. |
| 6,792,458 B1 | 9/2004 | Muret et al. |
| 6,795,856 B1 | 9/2004 | Bunch |
| 6,804,701 B2 | 10/2004 | Muret et al. |
| 6,816,455 B2 | 11/2004 | Goldberg et al. |
| 6,892,226 B1 | 5/2005 | Tso et al. |
| 6,925,454 B2 | 8/2005 | Lam et al. |
| 6,941,321 B2 | 9/2005 | Schuetze et al. |
| 6,957,229 B1 | 10/2005 | Dyor |
| 6,973,577 B1 | 12/2005 | Kouznetsov |
| 6,981,047 B2 | 12/2005 | Hanson et al. |
| 6,983,317 B1 | 1/2006 | Bishop et al. |
| 6,985,901 B1 | 1/2006 | Sachse et al. |
| 7,006,508 B2 | 2/2006 | Bondy et al. |
| 7,027,398 B2 | 4/2006 | Fang |
| 7,027,416 B1 | 4/2006 | Kriz |
| 7,031,941 B2 | 4/2006 | Garrow et al. |
| 7,046,247 B2 | 5/2006 | Hao et al. |
| 7,047,294 B2 | 5/2006 | Johnson et al. |
| 7,050,396 B1 | 5/2006 | Cohen et al. |
| 7,055,174 B1 | 5/2006 | Cope et al. |
| 7,058,976 B1 | 6/2006 | Dark |
| 7,076,275 B1 | 7/2006 | Karstens et al. |
| 7,083,095 B2 | 8/2006 | Hendrick |
| 7,093,020 B1 | 8/2006 | McCarty et al. |
| 7,143,151 B1 | 11/2006 | Kayashima et al. |
| 7,152,103 B1 | 12/2006 | Ryan et al. |
| 7,152,108 B1 | 12/2006 | Khan et al. |
| 7,171,681 B1 | 1/2007 | Duncan et al. |
| 7,203,674 B2 | 4/2007 | Cohen |
| 7,206,835 B2 | 4/2007 | Kusumoto et al. |
| 7,212,491 B2 | 5/2007 | Koga |
| 7,216,110 B1 | 5/2007 | Ogg et al. |
| 7,228,566 B2 | 6/2007 | Caceres et al. |
| 7,231,448 B1 | 6/2007 | O'Steen et al. |
| 7,246,162 B2 | 7/2007 | Tindal |
| 7,257,722 B2 | 8/2007 | Sone |
| 7,277,938 B2 | 10/2007 | Duimovich et al. |
| 7,277,941 B2 | 10/2007 | Ignatius et al. |
| 7,278,037 B2 | 10/2007 | Sone |
| 7,313,625 B2 | 12/2007 | Tindal et al. |
| 7,328,242 B1 | 2/2008 | McCarthy et al. |
| 7,346,658 B2 | 3/2008 | Simpson |
| 7,356,576 B2 | 4/2008 | Rabe |
| 7,359,967 B1 | 4/2008 | Synnestvedt et al. |
| 7,373,399 B2 | 5/2008 | Steele et al. |
| 7,376,722 B1 | 5/2008 | Sim et al. |
| 7,386,613 B2 | 6/2008 | Piccirilli et al. |
| 7,406,516 B2 | 7/2008 | Davis et al. |
| 7,447,909 B2 | 11/2008 | Reith |
| 7,466,690 B2 | 12/2008 | Schrodi |
| 7,472,412 B2 | 12/2008 | Wolf et al. |
| 7,474,617 B2 | 1/2009 | Molen et al. |
| 7,478,161 B2 | 1/2009 | Bernet et al. |
| 7,490,065 B1 | 2/2009 | Ogg et al. |
| 7,496,049 B2 | 2/2009 | Estrada et al. |
| 7,506,072 B2 | 3/2009 | Waldorf et al. |
| 7,523,191 B1 | 4/2009 | Thomas et al. |
| 7,526,541 B2 | 4/2009 | Roese et al. |
| 7,535,993 B2 | 5/2009 | Cai et al. |
| 7,536,459 B2 | 5/2009 | Johnson et al. |
| 7,570,743 B2 | 8/2009 | Barclay et al. |
| 7,571,237 B2 | 8/2009 | Pfitzmann |
| 7,580,356 B1 | 8/2009 | Mishra et al. |
| 7,587,453 B2 | 9/2009 | Bhrara et al. |
| 7,587,757 B2 * | 9/2009 | Scoggins et al. ............... 726/11 |
| 7,624,144 B1 | 11/2009 | Mitrov |
| 7,627,664 B2 | 12/2009 | Sutou et al. |
| 7,631,007 B2 | 12/2009 | Morris |
| 7,636,680 B2 | 12/2009 | Gatto |
| 7,639,613 B1 | 12/2009 | Ghannadian et al. |
| 7,647,406 B2 | 1/2010 | Liu |
| 7,657,540 B1 | 2/2010 | Bayliss |
| 7,664,974 B2 | 2/2010 | Sone |
| 7,676,570 B2 | 3/2010 | Levy et al. |
| 7,698,457 B2 | 4/2010 | Ghetie et al. |
| 7,730,120 B2 | 6/2010 | Singh et al. |
| 7,769,851 B1 | 8/2010 | Guruswamy et al. |
| 7,769,873 B1 | 8/2010 | Mackie |
| 7,779,073 B2 | 8/2010 | Hoile et al. |
| 7,788,330 B2 | 8/2010 | Goggin |
| 7,809,826 B1 | 10/2010 | Guruswamy |
| 7,852,849 B2 | 12/2010 | Davidson et al. |
| 7,873,719 B2 | 1/2011 | Bishop et al. |
| 7,885,194 B1 | 2/2011 | Narin et al. |
| 7,886,049 B2 | 2/2011 | Adelstein et al. |
| 7,904,478 B2 | 3/2011 | Yu et al. |
| 7,904,554 B1 | 3/2011 | Lu et al. |
| 7,933,926 B2 | 4/2011 | Ebert |
| 7,953,851 B2 | 5/2011 | Britton et al. |
| 7,958,233 B2 | 6/2011 | Fernández Gutierrez |
| 7,958,267 B1 | 6/2011 | Eiras et al. |
| 7,969,875 B2 | 6/2011 | Lin |
| 7,975,046 B2 | 7/2011 | Sheppard |
| 7,979,521 B2 | 7/2011 | Greaves et al. |
| 7,979,529 B2 | 7/2011 | Kreusch et al. |
| 7,996,493 B2 | 8/2011 | Hill |
| 8,001,246 B2 | 8/2011 | Lu et al. |
| 8,010,085 B2 | 8/2011 | Apte et al. |
| 8,010,602 B2 | 8/2011 | Shen et al. |
| 8,010,689 B2 | 8/2011 | Deninger et al. |
| 8,014,303 B2 | 9/2011 | Narin et al. |
| 8,015,277 B2 | 9/2011 | Brown et al. |
| 8,032,701 B1 | 10/2011 | Glade et al. |
| 8,041,022 B1 | 10/2011 | Andreasen et al. |
| 8,051,130 B2 | 11/2011 | Logan et al. |
| 8,051,168 B1 | 11/2011 | Boysko et al. |
| 8,055,709 B2 | 11/2011 | Singh et al. |
| 8,059,790 B1 | 11/2011 | Paterik et al. |
| 8,077,704 B2 | 12/2011 | Yin et al. |
| 8,078,679 B2 | 12/2011 | Kajekar et al. |
| 8,090,852 B2 | 1/2012 | Ianchici et al. |
| 8,099,500 B2 | 1/2012 | Deason |
| 8,117,314 B2 | 2/2012 | Croft et al. |
| 8,127,005 B2 | 2/2012 | Fernández Gutierrez |
| 8,135,134 B2 | 3/2012 | Orsini et al. |
| 8,135,833 B2 | 3/2012 | Cancel et al. |
| 8,145,753 B2 | 3/2012 | Inoue et al. |

(56) References Cited

U.S. PATENT DOCUMENTS

| | | |
|---|---|---|
| 8,156,155 B1 | 4/2012 | Yu et al. |
| 8,200,809 B2 | 6/2012 | Sheppard |
| 8,204,884 B2 | 6/2012 | Freedman et al. |
| 8,230,056 B2 | 7/2012 | Bishop et al. |
| 8,234,368 B1 | 7/2012 | Nielsen et al. |
| 8,244,859 B2 | 8/2012 | Ramakrishnan et al. |
| 8,274,979 B2 | 9/2012 | Bragagnini et al. |
| 8,281,027 B2 | 10/2012 | Martinez et al. |
| 8,281,175 B2 | 10/2012 | Blackburn et al. |
| 8,281,360 B2 | 10/2012 | Flewallen et al. |
| 8,316,134 B2 | 11/2012 | Tanimoto |
| 8,321,515 B1 | 11/2012 | Gailloux et al. |
| 8,327,012 B1 | 12/2012 | Nguyen et al. |
| 8,332,477 B1 | 12/2012 | Kaiserlian et al. |
| 8,332,507 B2 | 12/2012 | Wagh et al. |
| 8,339,959 B1 | 12/2012 | Moisand et al. |
| 8,352,590 B2 | 1/2013 | Sankaran et al. |
| 8,380,234 B2 | 2/2013 | Kronander et al. |
| 8,380,863 B2 | 2/2013 | Natarajan et al. |
| 8,396,075 B2 | 3/2013 | Skoczkowski et al. |
| 8,407,038 B2 | 3/2013 | Bizzarri et al. |
| 8,416,695 B2 | 4/2013 | Liu et al. |
| 8,438,089 B1 | 5/2013 | Wasserblat et al. |
| 8,478,879 B2 | 7/2013 | Brown et al. |
| 8,479,212 B2 | 7/2013 | Jamjoom et al. |
| 8,527,577 B2 | 9/2013 | Lu et al. |
| 8,542,592 B2 | 9/2013 | Moisand et al. |
| 8,542,676 B2 | 9/2013 | Lakhani et al. |
| 8,544,023 B2 | 9/2013 | Sim-Tang et al. |
| 8,572,252 B2 | 10/2013 | Ahuja et al. |
| 8,589,516 B2 | 11/2013 | Wheeler et al. |
| 8,595,490 B2 | 11/2013 | Von Mueller et al. |
| 8,621,090 B2 | 12/2013 | Bustamente |
| 8,626,860 B1 | 1/2014 | Gailloux et al. |
| 8,627,479 B2 | 1/2014 | Wittenstein et al. |
| 8,630,836 B2 | 1/2014 | Wasser |
| 8,630,854 B2 | 1/2014 | Marvit |
| 8,634,423 B1 | 1/2014 | Olding et al. |
| 8,698,872 B2 | 4/2014 | Begeja et al. |
| 8,712,019 B2 | 4/2014 | Anchan et al. |
| 8,713,453 B2 | 4/2014 | Shahine et al. |
| 8,725,869 B1 | 5/2014 | Reiner et al. |
| 8,756,312 B2 | 6/2014 | Malloy et al. |
| 8,769,059 B1 | 7/2014 | Chheda et al. |
| 8,782,283 B2 | 7/2014 | Attanasio |
| 8,793,395 B2 | 7/2014 | Cadiou et al. |
| 8,812,740 B2 | 8/2014 | Li et al. |
| 8,813,090 B2 | 8/2014 | Jamjoom et al. |
| 2001/0052081 A1 | 12/2001 | McKibben et al. |
| 2002/0026505 A1 | 2/2002 | Terry |
| 2002/0042821 A1 | 4/2002 | Muret et al. |
| 2002/0078382 A1 | 6/2002 | Sheikh et al. |
| 2002/0099818 A1 | 7/2002 | Russell et al. |
| 2002/0174235 A1 | 11/2002 | Likourezos |
| 2003/0023715 A1 | 1/2003 | Reiner et al. |
| 2003/0043820 A1 | 3/2003 | Goringe et al. |
| 2003/0059017 A1 | 3/2003 | Cugalj et al. |
| 2003/0065605 A1 | 4/2003 | Gatto |
| 2003/0120822 A1 | 6/2003 | Langrind et al. |
| 2003/0140131 A1 | 7/2003 | Chandrashekhar et al. |
| 2003/0214504 A1 | 11/2003 | Hao et al. |
| 2004/0022191 A1 | 2/2004 | Bernet et al. |
| 2004/0049693 A1 | 3/2004 | Douglas |
| 2004/0105424 A1 | 6/2004 | Skoczkowski et al. |
| 2004/0181599 A1 | 9/2004 | Kreusch et al. |
| 2004/0199623 A1 | 10/2004 | Houri |
| 2004/0202295 A1 | 10/2004 | Shen et al. |
| 2004/0215770 A1 | 10/2004 | Maher, III et al. |
| 2004/0249938 A1 | 12/2004 | Bunch |
| 2004/0255126 A1 | 12/2004 | Reith |
| 2004/0267729 A1 | 12/2004 | Swaminathan et al. |
| 2005/0013259 A1 | 1/2005 | Papoushado et al. |
| 2005/0076117 A1 | 4/2005 | Hou et al. |
| 2005/0174937 A1 | 8/2005 | Scoggins et al. |
| 2005/0246419 A1 | 11/2005 | Jaatinen |
| 2006/0015613 A1 | 1/2006 | Greaves |
| 2006/0026268 A1 | 2/2006 | Sanda |
| 2006/0041660 A1 | 2/2006 | Bishop et al. |
| 2006/0064391 A1 | 3/2006 | Petrov et al. |
| 2006/0109847 A1 | 5/2006 | Satou |
| 2006/0168332 A1 | 7/2006 | Pfitzmann |
| 2007/0055766 A1 | 3/2007 | Petropoulakis et al. |
| 2007/0083924 A1 | 4/2007 | Lu |
| 2007/0156889 A1 | 7/2007 | Bhrara et al. |
| 2007/0203991 A1 | 8/2007 | Fisher et al. |
| 2007/0266145 A1 | 11/2007 | Nesbitt et al. |
| 2008/0028031 A1 | 1/2008 | Bailey et al. |
| 2008/0036767 A1 | 2/2008 | Janzen |
| 2008/0052392 A1 | 2/2008 | Webster et al. |
| 2008/0147623 A1 | 6/2008 | Swaminathan et al. |
| 2008/0162397 A1 | 7/2008 | Zaltzman |
| 2008/0183867 A1 | 7/2008 | Singh et al. |
| 2009/0052443 A1 | 2/2009 | Kolenchery et al. |
| 2009/0077623 A1 | 3/2009 | Baum et al. |
| 2009/0132450 A1 | 5/2009 | Schlottmann |
| 2009/0150472 A1 | 6/2009 | Devarakonda et al. |
| 2009/0165142 A1 | 6/2009 | Adelstein et al. |
| 2009/0171960 A1 | 7/2009 | Katzir |
| 2009/0193037 A1 | 7/2009 | Yu et al. |
| 2009/0254653 A1 | 10/2009 | Kowa et al. |
| 2010/0042545 A1 | 2/2010 | Ogg et al. |
| 2010/0057858 A1 | 3/2010 | Shen et al. |
| 2010/0071053 A1 | 3/2010 | Ansari et al. |
| 2010/0079464 A1 | 4/2010 | Matsumura |
| 2010/0094910 A1 | 4/2010 | Bayliss |
| 2010/0095017 A1 | 4/2010 | Ghetie et al. |
| 2010/0115018 A1 | 5/2010 | Yoon et al. |
| 2010/0150138 A1 | 6/2010 | Bjorsell et al. |
| 2010/0182320 A1 | 7/2010 | Cartan |
| 2010/0199189 A1 | 8/2010 | Ben-Aroya et al. |
| 2010/0211672 A1 | 8/2010 | Brown et al. |
| 2010/0217837 A1 | 8/2010 | Ansari et al. |
| 2010/0228854 A1 | 9/2010 | Morrison et al. |
| 2010/0250497 A1* | 9/2010 | Redlich et al. ................ 707/661 |
| 2010/0281161 A1 | 11/2010 | Cohn et al. |
| 2010/0287286 A1 | 11/2010 | Bustamente |
| 2010/0309786 A1 | 12/2010 | Moisand et al. |
| 2010/0312884 A1 | 12/2010 | Nandy et al. |
| 2010/0312903 A1 | 12/2010 | Miyata |
| 2010/0318647 A1 | 12/2010 | Savoor et al. |
| 2010/0321183 A1 | 12/2010 | Donovan et al. |
| 2011/0010449 A1 | 1/2011 | Andrews et al. |
| 2011/0029667 A1 | 2/2011 | Imbimbo et al. |
| 2011/0030067 A1 | 2/2011 | Wilson |
| 2011/0047273 A1 | 2/2011 | Young, Jr. et al. |
| 2011/0161507 A1 | 6/2011 | O'Sullivan et al. |
| 2011/0173330 A1 | 7/2011 | Gong et al. |
| 2011/0182205 A1 | 7/2011 | Gerdes et al. |
| 2011/0206198 A1 | 8/2011 | Freedman et al. |
| 2011/0208859 A1 | 8/2011 | Fernández Gutierrez |
| 2011/0252032 A1 | 10/2011 | Fitzgerald et al. |
| 2011/0270977 A1 | 11/2011 | Ansiaux et al. |
| 2011/0283343 A1 | 11/2011 | Jaeger et al. |
| 2011/0289134 A1 | 11/2011 | De Los Reyes et al. |
| 2011/0296014 A1 | 12/2011 | Cancel et al. |
| 2012/0005331 A1 | 1/2012 | Beattie, Jr. et al. |
| 2012/0084081 A1 | 4/2012 | Melamed et al. |
| 2012/0096145 A1* | 4/2012 | Le et al. ..................... 709/224 |
| 2012/0110062 A1 | 5/2012 | Savage et al. |
| 2012/0117236 A1 | 5/2012 | Fukuda et al. |
| 2012/0143972 A1 | 6/2012 | Malik et al. |
| 2012/0150955 A1 | 6/2012 | Tseng |
| 2012/0158955 A1 | 6/2012 | Kim et al. |
| 2012/0191854 A1 | 7/2012 | Bharatia et al. |
| 2012/0197976 A1 | 8/2012 | Welingkar et al. |
| 2012/0203847 A1 | 8/2012 | Kendall et al. |
| 2012/0224021 A1 | 9/2012 | Begeja et al. |
| 2012/0239805 A1 | 9/2012 | Savoor et al. |
| 2012/0254403 A1 | 10/2012 | Imbimbo et al. |
| 2012/0259975 A1 | 10/2012 | Le et al. |
| 2012/0265824 A1 | 10/2012 | Lawbaugh |
| 2012/0317196 A1 | 12/2012 | Schigel et al. |
| 2012/0324470 A1 | 12/2012 | Jamjoom et al. |
| 2012/0331126 A1 | 12/2012 | Abdul-Razzak et al. |

(56) References Cited

U.S. PATENT DOCUMENTS

| | | |
|---|---|---|
| 2013/0007129 A1 | 1/2013 | German et al. |
| 2013/0024506 A1 | 1/2013 | Setton |
| 2013/0091241 A1 | 4/2013 | Goetz et al. |
| 2013/0097308 A1 | 4/2013 | Le et al. |
| 2013/0155068 A1 | 6/2013 | Bier et al. |
| 2013/0159234 A1 | 6/2013 | Xing et al. |
| 2013/0191493 A1 | 7/2013 | Le et al. |
| 2013/0207980 A1 | 8/2013 | Ankisettipalli et al. |
| 2013/0262622 A1 | 10/2013 | Li et al. |
| 2013/0268443 A1 | 10/2013 | Petrov et al. |
| 2013/0275306 A1 | 10/2013 | Ignatchenko et al. |
| 2013/0293551 A1 | 11/2013 | Erez et al. |
| 2013/0304761 A1* | 11/2013 | Redlich et al. ............. 707/781 |
| 2013/0311557 A1 | 11/2013 | Aston Motes et al. |
| 2014/0059024 A1 | 2/2014 | Le et al. |
| 2014/0082087 A1 | 3/2014 | Bustamente |
| 2014/0086102 A1 | 3/2014 | Doddapaneni |
| 2014/0149487 A1 | 5/2014 | Dikmen et al. |
| 2014/0150077 A1 | 5/2014 | Roy et al. |
| 2014/0222522 A1 | 8/2014 | Chait |
| 2015/0200967 A1* | 7/2015 | Redlich ............. G06Q 10/10 726/1 |
| 2015/0215186 A1 | 7/2015 | Alonso Franco et al. |

OTHER PUBLICATIONS

"Securing Public Instant Messaging (IM) at Work", by Nigel Williams, Joanne Ly, Jul. 2004 (pp. 43) http://caia.swin.edu.au/reports/040726A/CAIA-TR-040726A.pdf.

"Network Element Service Specification Template", by S. Shenker et al., Sep. 1997 (pp. 22) http://tools.ietf.org/pdf/rfc2216.pdf.

"RSVP+: An Extension to RSVP", by Silvano Gai et al., Jun. 1999 (pp. 18) http://tools.ietf.org/pdf/draft-sgai-rsvp-plus-00.pdf.

"Cellular access control and charging for mobile operator wireless local area networks", by H. Haverinen et al., Jan. 14, 2003 (p. 1) http://ieeexplore.ieee.org/xpl/articleDetails.jsp?tp=&arnumber=1160081&url=http%3A%2F%2Fieeexplore.ieee.org%2Fxpls%2Fabs_all.jsp%3Farnumber%3D1160081.

"An Analysis of Anonymity in the Bitcoin System", by Reid Fergal et al., May 7, 2012 (pp. 30) http://arxiv.org/pdf/1107.4524.pdf?origin=publication_detail.

* cited by examiner

INTELLIGENT FEEDBACK LOOP TO ITERATIVELY REDUCE INCOMING NETWORK DATA FOR ANALYSIS

FIELD OF TECHNOLOGY

This disclosure relates generally to the technical field of network communication, and in one example embodiment, this disclosure relates to a method, apparatus, and system of a feedback loop to iteratively remove extraneous portions of data in packets to be analyzed.

BACKGROUND

An application specific integrated circuit may be designed to process a large volume of data to highlight actions of interest according to a network traffic monitoring system. When changes are made to a network device (e.g., a router, a switch), the application specific integrated circuit may no longer be able to process the large volume of data to highlight the actions of interest. As such, investments in engineering time, labor cost, inventory, and/or distribution may be wasted.

The application specific integrated circuit may be expensive to redesign. For example, the application specific integrated circuit may not adapt to changes in a network topology (e.g., routing paths, network nodes, security protocols, communication protocols). When the application specific integrated circuit is inoperable, cybercrime and other illegal activities may be unnoticed and/or increase. As such, law enforcement resources may not be able to prevent illegal activities and threats to public security.

SUMMARY

A method, apparatus and system related to an intelligent feedback loop to iteratively reduce target packet analysis is disclosed. In one aspect, a method of a network traffic monitoring system includes processing a flow data received through an aggregation switch of a network traffic monitoring system in a first stage module of the network traffic monitoring system, filtering the flow data to a target data based on a packet classification in the first stage module, determining that a portion of a target data is an extraneous data based on a content filtering algorithm applied in a data processing system of the network traffic monitoring system, and iteratively removing from the target data the extraneous data based on a feedback loop created between the data processing system and the first stage module of the network traffic monitoring system.

The method may involve processing a flow data received through an aggregation switch of a network traffic monitoring system in the first stage and converting the flow data to a target data based on a packet classification in the first stage. The method may also involve applying a content filtering algorithm to the target data in the second stage and communicating which portion of the target data is extraneous from the second stage to the first stage based on the content filtering algorithm. The method may further involve applying a static filtering algorithm of the flow data based on an internet protocol analysis and a port analysis in the first stage, applying a tuple hash algorithm to map the flow data having a variable length into an ordered list of elements having a fixed length of the flow data in the first stage, and dynamically filtering the flow data in the first stage based on the static filtering algorithm and the tuple hash algorithm, and based on a removal of the extraneous data communicated from a filtering intelligence algorithm of the second stage.

The method may further include applying a zero-copy driver and a use buffer in at least one of the first stage and the second stage, reducing processing power and memory usage through the application of the zero-copy driver and the use buffer in the second stage, buffering the target data in a random access memory in the second stage, classifying a set of protocols associated with the target data in the second stage, applying the filtering intelligence algorithm to extract the extraneous data from the target data in the second stage, a determining a communication mode between the second stage and the dynamic filtering operation of the first stage so that a request to remove the extraneous data based on the filtering intelligence algorithm of the second stage is executable.

The method may also involve extracting a meta data associated with the target data in the second stage, communicating the extracted meta data to an data retention server, applying a regex based targeting algorithm to the target data in the second stage to produce a set of regular expressions describing a search pattern and communicating the set of regular expressions to a master controller. The method may further involve analyzing the target data to discover an action of interest in the set of regular expressions associated with a target individual in the second stage. The action of interest may be subject to a governmental permission as to how the action of interest is usable in a lawful data interception system.

In another aspect, a system includes an aggregation switch to consolidate a flow data, a first stage module to create a target data from the flow data through an iterative exclusion of an extraneous data, and a data processing system comprising a processor and a memory to iteratively remove from the target data the extraneous data, and to form a feedback loop between the data processing system and the first stage module of the network traffic monitoring system. The first stage module may process the flow data received through an aggregation switch of the network traffic monitoring system and convert the flow data to a target data based on a packet classification in the first stage. The data processing system may apply a content filtering algorithm to the target data in the data processing system and communicate which portion of the target data is extraneous from the data processing system to the first stage module based on the content filtering algorithm. The first stage module may apply a static filtering algorithm of the flow data based on an internet protocol analysis and a port analysis using the first stage module, a tuple hash algorithm to map the flow data having a variable length into an ordered list of elements having a fixed length of the flow data in the first stage, and dynamically filter the flow data in the first stage based on the static filtering algorithm and the tuple hash algorithm, and based on a removal of the extraneous data communicated from a filtering intelligence algorithm of the data processing system.

The data processing system may further include applying a zero-copy driver and a use buffer in the data processing system, reducing processing power and memory usage through the application of the zero-copy driver and the use buffer in the data processing system, buffering the target data in a random access memory in the data processing system, classifying a set of protocols associated with the target data in the data processing system, applying the filtering intelligence algorithm to extract the extraneous data from the target data in the data processing system, and determining a communication mode between the data processing system and the dynamic filtering operation of the first stage so that a request to remove the extraneous data based on the filtering intelligence algorithm of the data processing system is executable.

The data processing system may further involve extracting a meta data associated with the target data in the data processing system, communicating the extracted meta data to an data retention server, applying a regex based targeting algorithm to the target data in the data processing system to produce a set of regular expressions describing a search pattern, and communicating the set of regular expressions to a master controller. The data processing system may also analyze the target data to discover an action of interest in the set of regular expressions associated with a target individual in the data processing system.

In yet another aspect, a method of a network traffic monitoring system includes processing a flow data received through an aggregation switch of a network traffic monitoring system in a first stage module of the network traffic monitoring system, filtering the flow data to a target data based on a packet classification in the first stage module, determining that a portion of a target data is an extraneous data based on a content filtering algorithm applied in a data processing system of the network traffic monitoring system, and iteratively removing from the target data the extraneous data based on a feedback loop created between the data processing system and the first stage module of the network traffic monitoring system.

The method of a network traffic monitoring system may also involve applying a content filtering algorithm to the target data in the data processing system and communicating which portion of the target data is extraneous from the data processing system to the first stage module based on the content filtering algorithm. The method of a network traffic monitoring system may further involve applying a static filtering algorithm of the flow data based on an internet protocol analysis and a port analysis in the first stage, applying a tuple hash algorithm to map the flow data having a variable length into an ordered list of elements having a fixed length of the flow data in the first stage, and dynamically filtering the flow data in the first stage module based on the static filtering algorithm and the tuple hash algorithm, and based on a removal of the extraneous data communicated from a filtering intelligence algorithm of the data processing system.

The method of a network traffic monitoring system may also include applying a zero-copy driver and a use buffer in the data processing system, reducing processing power and memory usage through the application of the zero-copy driver and the use buffer in the data processing system, buffering the target data in a random access memory in the data processing system, classifying a set of protocols associated with the target data in the data processing system, applying the filtering intelligence algorithm to extract the extraneous data from the target data in the data processing system, and determining a communication mode between the data processing system and the dynamic filtering operation of the first stage module so that a request to remove the extraneous data based on the filtering intelligence algorithm of the data processing system is executable.

The method of a network traffic monitoring system may also include extracting a meta data associated with the target data in the data processing system, communicating the extracted meta data to a data retention server, applying a regex based targeting algorithm to the target data in the data processing system to produce a set of regular expressions describing a search pattern, and communicating the set of regular expressions to a master controller. The method of a network traffic monitoring system may further include analyzing the target data to discover an action of interest in the set of regular expressions associated with a target individual in the data processing system. The action of interest may be subject to a governmental permission as to how the action of interest is usable in a lawful data interception system.

BRIEF DESCRIPTION OF DRAWINGS

Example embodiments are illustrated by way of example and not limitation in the figures of the accompanying drawings, in which like references indicate similar elements and in which.

Figure 1:
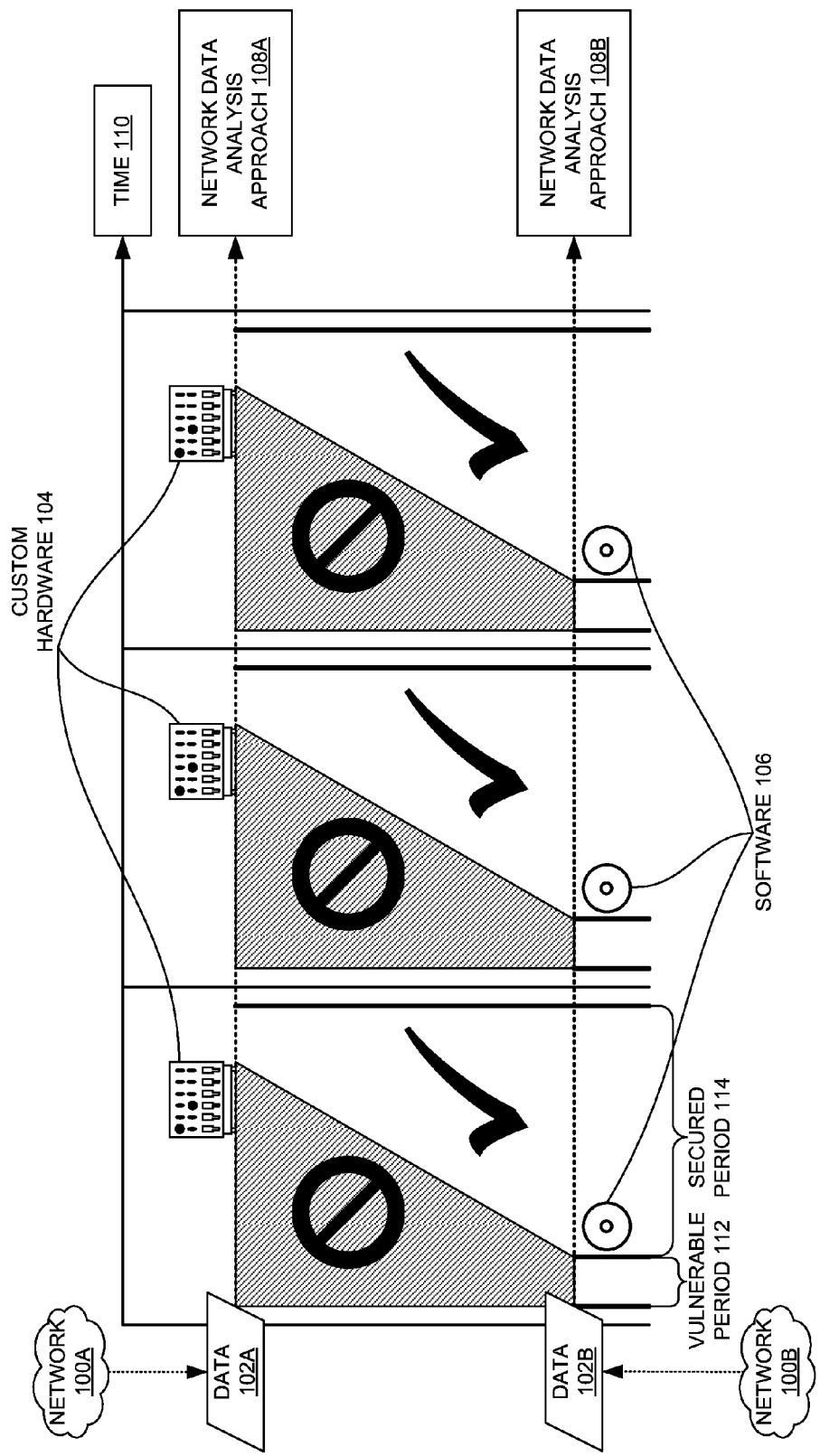
FIG. 1 is an event map illustrating temporal discrepancies in responses to changes in network security by different network monitoring solutions, according to one embodiment.

Other features of the present embodiments will be apparent from the accompanying drawings and from the detailed description that follows.

DETAILED DESCRIPTION

Example embodiments, as described below, may be used to provide a method, a system, and/or an apparatus of implementing an intelligent feedback loop to iteratively reduce target packet analysis, according to one or more embodiments. Although the present embodiments have been described with reference to specific example embodiments, it will be evident that various modifications and changes may be made to these embodiments without departing from the broader spirit and scope of the various embodiments.

In one embodiment, a method of a network traffic monitoring system 200 includes processing a flow data 302 received through an aggregation switch 304 of a network traffic monitoring system 200 in a first stage module 306 of the network traffic monitoring system 200, filtering the flow data 302 to a target data 312 based on a packet classification in the first stage module 306, determining that a portion of a target data 312 is an extraneous data 318 based on a content filtering algorithm applied in a data processing system 308 of the network traffic monitoring system 200, and iteratively removing from the target data 312 the extraneous data 318 based on a feedback loop 206 created between the data processing system 308 and the first stage module 306 of the network traffic monitoring system 200.

In another embodiment, a system includes an aggregation switch 304 to consolidate a flow data 302, a first stage module 306 to create a target data 312 from the flow data 302 through an iterative exclusion of an extraneous data 318, and a data processing system 308 comprising a processor 328 and a random access memory 330 to iteratively remove from the target data 312 the extraneous data 318, and to form a feedback loop 206 between the data processing system 308 and the first stage module 306 of the network traffic monitoring system 200. The first stage module 306 may process the flow data 302 received through an aggregation switch 304 of the network traffic monitoring system 200 and convert the flow data 302 to a target data 312 based on a packet classification in the first stage. The data processing system 308 may apply a content filtering algorithm to the target data 312 in the data processing system 308 and communicate which portion of the target data 312 is extraneous from the data processing system 308 to the first stage module 306 based on the content filtering algorithm. The first stage module 306 may apply a static filtering algorithm of the flow data 302 based on an internet protocol analysis and a port analysis using the first stage module 306, a tuple hash algorithm to map the flow data 302 having a variable length into an ordered list of elements having a fixed length of the flow data 302 in the first stage, and dynamically filter the flow data 302 in the first stage based on the static filtering algorithm and the tuple hash algorithm, and based on a removal of the extraneous data 318 communicated from a filtering intelligence algorithm of the data processing system.

In yet another embodiment, a method of a network traffic monitoring system 200 includes processing a flow data 302 received through an aggregation switch 304 of a network traffic monitoring system 200 in a first stage module 306 of the network traffic monitoring system 200, filtering the flow data 302 to a target data 312 based on a packet classification in the first stage module 306, determining that a portion of a target data 312 is an extraneous data 318 based on a content filtering algorithm applied in a data processing system 308 of the network traffic monitoring system 200, and iteratively removing from the target data 312 the extraneous data 318 based on a feedback loop 206 created between the data processing system 308 and the first stage module 306 of the network traffic monitoring system 200.

FIG. 1 is an event map illustrating temporal discrepancies in responses to changes in network security by different network monitoring solutions, according to one embodiment. Particularly, FIG. 1 illustrates that implementing security changes in software may reduce an amount of time in which there is a blackout in a network monitored for lawful data interception. In FIG. 1, a network 100A may transmit a data 102A and may implement a custom hardware 104 to facilitate a network data analysis approach 108A with respect to time 110. Additionally, a network 100B may transmit a data 102B. In addition, the network 100B may implement a software 106 to facilitate a network data analysis approach 108B with respect to time 110. Responses to network events may be preceded by a vulnerable period 112 and may be followed by a secured period 114. Network data analysis approach 108A may yield a longer vulnerable period (e.g. the vulnerable period 112) and a shorter secured period (e.g. the secured period 114) than network data analysis approach 108B.

Figure 2:
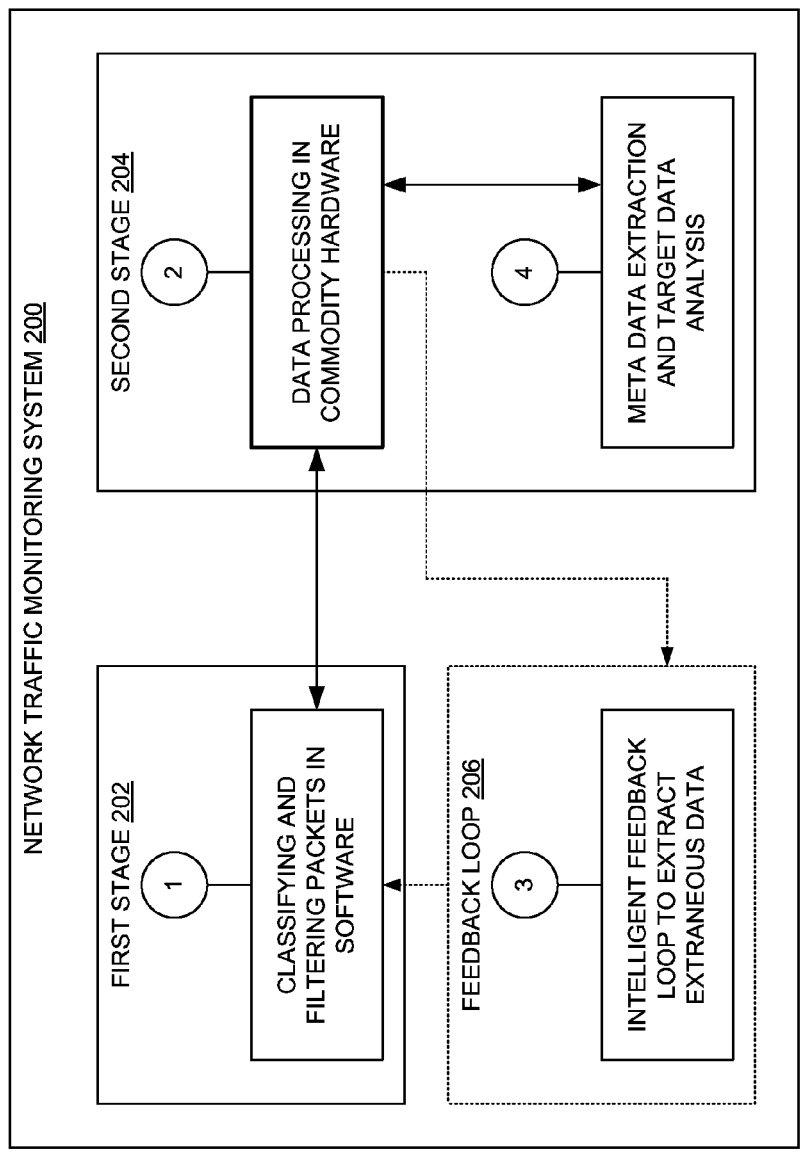
FIG. 2 is a functional block diagram of a network traffic monitoring system 200 comprising a first stage 202 communicating with a second stage 204, which provides feedback to the first stage 202 through a feedback loop 206, according to one embodiment.

FIG. 2 is a functional block diagram of a network traffic monitoring system 200 comprising a first stage 202 communicating with a second stage 204, which provides feedback to the first stage 202 through a feedback loop 206, according to one embodiment. The first stage 202 may comprise of classifying and filtering packets in software. The second stage 204 may involve data processing in commodity hardware. For example, commodity hardware may include a general purpose computing system running on a general purpose processor (e.g., an Intel® brand integrated circuit). Additionally, the second stage 204 may also involve a meta data extraction and target data analysis. The second stage 204 may further involve a feedback loop 206 with the first stage 202 to extract extraneous data.

A stage (e.g. a first stage 202, a second stage 204) is a singular phase in a series of phases that take place in consecutive fashion with respect to time. A stage may be implemented in software or hardware and may involve the manipulation of data before and/or after additional stages. A series of stages may be orchestrated to perform a particular function. The stages in the series may also be able to establish a communication medium for the purpose of providing feedback to an earlier or a later stage.

The feedback loop 206 may be a control system that allows for feedback and self-correction. The feedback loop 206 may adjusts its operation according to differences between an actual output and a desired output in the second stage 204 of FIG. 2. To effect the output of the second stage 204, the feedback loop 206 may involve a modification in the data processing of the first stage 202 of FIG. 2.

Figure 3:
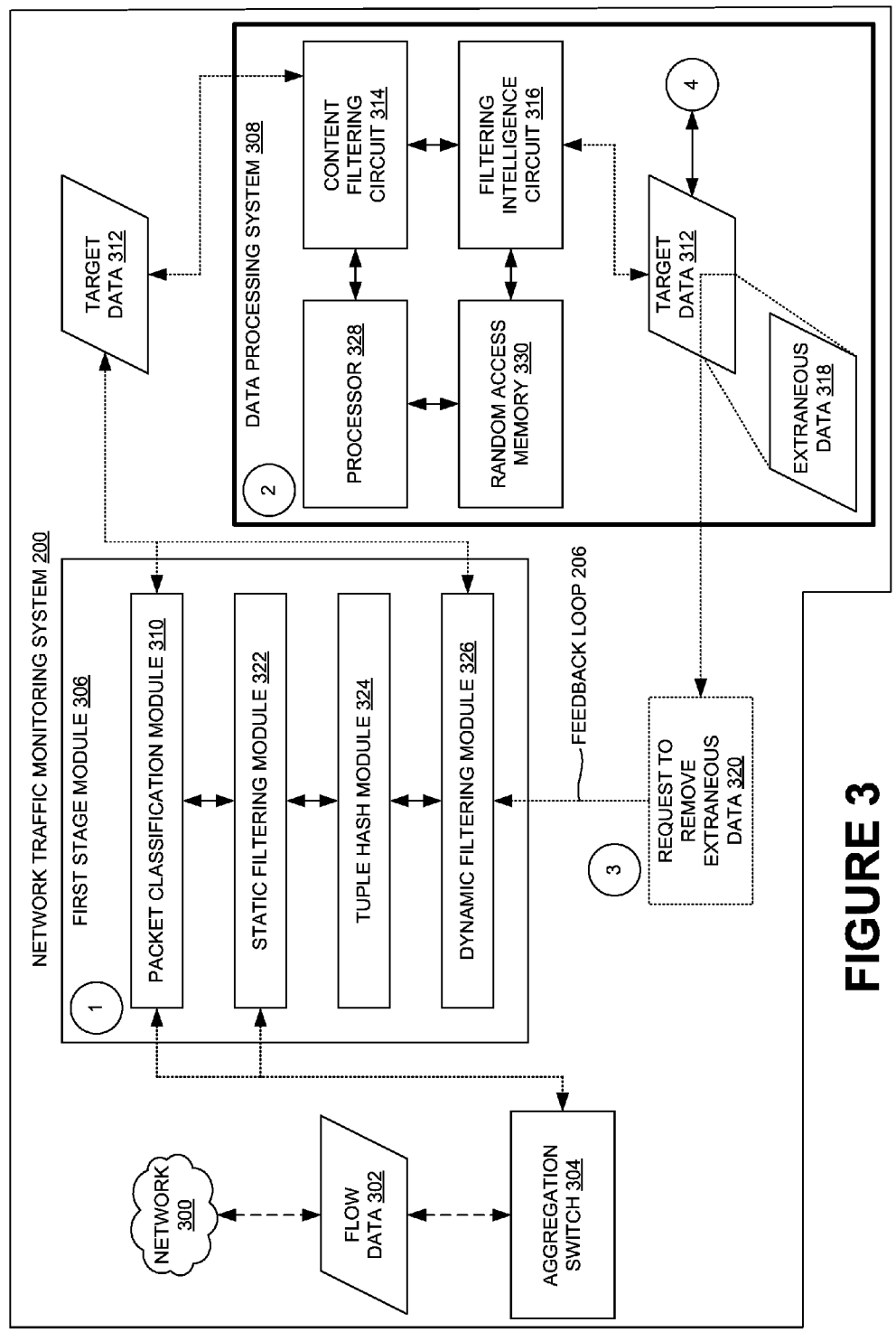
FIG. 3 is a functional block diagram that illustrates the components of the feedback loop 206 of the network traffic monitoring system 200 of FIG. 2, according to one embodiment.

FIG. 3 is a functional block diagram that illustrates the components of the feedback loop 206 of the network traffic monitoring system 200 of FIG. 2, according to one embodiment. The network traffic monitoring system 200 may comprise of a network 300 transmitting a flow data 302 processed by an aggregation switch 304 to a first stage module 306. The first stage module 306 may also include a packet classification module 310 which may convert the flow data 302 to a target data 312. The target data 312 may be communicated to a data processing system 308 which may include a content filtering circuit 314 and a filtering intelligence circuit 316 associated with a processor 328 and a random access memory of the data processing system 308. An extraneous data 318 may be extracted based on the content filtering circuit 314 and the filtering intelligence circuit 316. A request to remove the extraneous data 320 may be communicated to the first stage module 306. The first stage module may further include a static filtering module 322, a tuple hash module 324 and a dynamic filtering module 326.

The extraneous data 318 may be a portion of the target data 312 of FIG. 3 that is not applicable or relevant in a network traffic monitoring system 200 used by a lawful data interception system 710.

The filtering intelligence circuit 316 may be a hardware component that comprises a set of instructions used to classify the target data 312 in FIG. 3 according to an analysis of protocols associated with the target data 312. The filtering intelligence circuit 316 may also facilitate a communication mode with the dynamic filtering module 326 in order to establish a feedback loop 206 to iteratively remove the extraneous data 318.

According to one embodiment, a method of a network traffic monitoring system 200 includes processing a flow data 302 received through an aggregation switch 304 in a first stage module 306 of the network traffic monitoring system 200. The method may also involve filtering the flow data 302 to a target data 312 based on a packet classification performed by a packet classification module 310 in the first stage module 306. The method may also involve determining that a portion of a target data 312 is an extraneous data 318 based on a content filtering algorithm implemented by a content filtering circuit 314 in a data processing system 308 of the network traffic monitoring system 200. Furthermore, the method may also involve iteratively removing from the target data 312 the extraneous data 318 based on a feedback loop 206 created between the data processing system 308 and the first stage module 306 of the network traffic monitoring system 200.

The method of a network traffic monitoring system 200 may involve processing a flow data 302 received through an aggregation switch 304 of a network traffic monitoring system 200 in the first stage 202 and converting the flow data 302 to a target data 312 based on a packet classification performed by a packet classification module 310 in the first stage 202. The method may also involve applying a content filtering algorithm of the content filtering circuit 314 to the target data 312 in the second stage 204 and communicating which portion of the target data 312 is extraneous from the second stage 204 to the first stage 202 based on the content filtering algorithm of the content filtering circuit 314.

In another embodiment, a network traffic monitoring system 200 includes an aggregation switch 304 to consolidate a flow data 302, a first stage module 306 to create a target data 312 from the flow data 302 through an iterative exclusion of an extraneous data 318, and a data processing system 308 comprising a processor 328 and a memory to iteratively remove from the target data 312 the extraneous data 318, and to form a feedback loop 206 between the data processing system 308 and the first stage module 306 of the network traffic monitoring system 200. The first stage module 306 may process the flow data 302 received through an aggregation switch 304 of the network traffic monitoring system 200 and convert the flow data 302 to a target data 312 based on a packet classification performed by a packet classification module 310 in the first stage 202. The data processing system 308 may apply a content filtering algorithm of the content filtering circuit 314 to the target data 312 in the data processing system 308 and communicate which portion of the target data 312 is extraneous from the data processing system 308 to the first stage module 306 based on the content filtering algorithm implemented by the content filtering circuit 314.

In yet another embodiment, a method of a network traffic monitoring system 200 includes processing a flow data 302 received through an aggregation switch 304 in a first stage module 306 of the network traffic monitoring system 200. The method may also involve filtering the flow data 302 to a target data 312 based on a packet classification performed by a packet classification module 310 in the first stage module 306. The method may also involve determining that a portion of a target data 312 is an extraneous data 318 based on a content filtering algorithm implemented by a content filtering circuit 314 in a data processing system 308 of the network traffic monitoring system 200. Furthermore, the method may also involve iteratively removing from the target data 312 the extraneous data 318 based on a feedback loop 206 created between the data processing system 308 and the first stage module 306 of the network traffic monitoring system 200.

The method of a network traffic monitoring system 200 may also involve applying a content filtering algorithm of the content filtering circuit 314 to the target data 312 in the data processing system 308 and communicating which portion of the target data 312 is extraneous from the data processing system 308 to the first stage 202 module based on the content filtering algorithm of the content filtering circuit 314.

Figure 4:
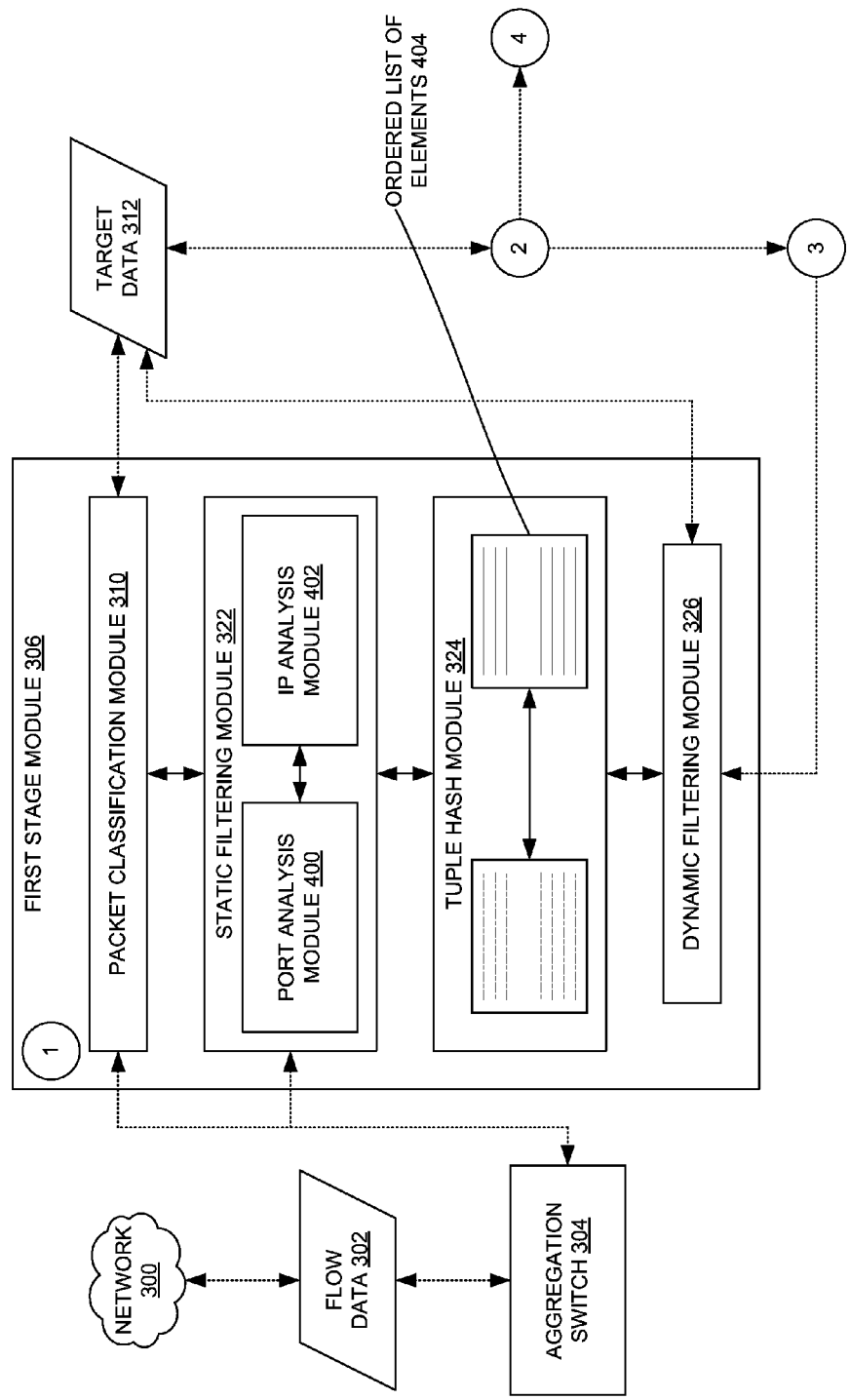
FIG. 4 is a functional block diagram that illustrates the first stage module of FIG. 3 mapping the flow data 302 into an ordered list of elements 404, according to one embodiment.

FIG. 4 is a functional block diagram that illustrates the first stage module 306 of FIG. 3 mapping the flow data 302 into an ordered list of elements 404, according to one embodiment. In FIG. 4, the static filtering module 322 of the first stage module 306 may include a port analysis module 400 and a IP analysis module 402. The tuple hash module 324 may produce an ordered list of elements 404 based on the flow data 302.

In one embodiment, the method of a network traffic monitoring system 200 involves applying a static filtering algorithm implemented by a static filtering module 322 to the flow data 302 based on a port analysis executed by a port analysis module 400 and a protocol analysis executed by a IP analysis module 402 in the first stage 202. The method may also involve applying a tuple hash algorithm implemented by a tuple hash module 324 to map the flow data 302 having a variable length into an ordered list of elements 404 having a fixed length of the flow data 302 in the first stage 202. The method may further involve dynamically filtering the flow data 302 in the first stage 202 based on the static filtering algorithm implemented by a static filtering module 322 and the tuple hash algorithm implemented by a tuple hash module 324, and based on a removal of the extraneous data 318 communicated from a filtering intelligence algorithm implemented by a filtering intelligence circuit 316 of the second stage 204.

In another embodiment, the first stage module 306 of the network traffic monitoring system 200 may apply a static filtering algorithm, implemented by a static filtering module 322, to the flow data 302 based on a port analysis executed by a port analysis module 400 and an internet protocol analysis executed by a IP analysis module 402 using the first stage module 306. The system may also include a tuple hash algorithm implemented by a tuple hash module 324 to map the flow data 302 having a variable length into an ordered list of elements 404 having a fixed length of the flow data 302 in the first stage 202. The system may further involve dynamically filtering the flow data 302 in the first stage 202 based on the static filtering algorithm implemented by a static filtering module 322 and the tuple hash algorithm implemented by a tuple hash module 324, and based on a removal of the extraneous data 318 communicated from a filtering intelligence algorithm implemented by a filtering intelligence circuit 316 of the data processing system 308.

In yet another embodiment, the method of a network traffic monitoring system 200 involves applying a static filtering algorithm implemented by a static filtering module 322 to the flow data 302 based on an internet protocol analysis executed by a IP analysis module 402 and a port analysis executed by a port analysis module 400 in the first stage 202. The method may also involve applying a tuple hash algorithm implemented by a tuple hash module 324 to map the flow data 302 having a variable length into an ordered list of elements 404 having a fixed length of the flow data 302 in the first stage 202.

The method may further involve dynamically filtering the flow data 302 in the first stage module 306 based on the static filtering algorithm implemented by a static filtering module 322 and the tuple hash algorithm implemented by a tuple hash module 324, and based on a removal of the extraneous data 318 communicated from a filtering intelligence algorithm implemented by a filtering intelligence circuit 316 of the data processing system 308.

Figure 5:
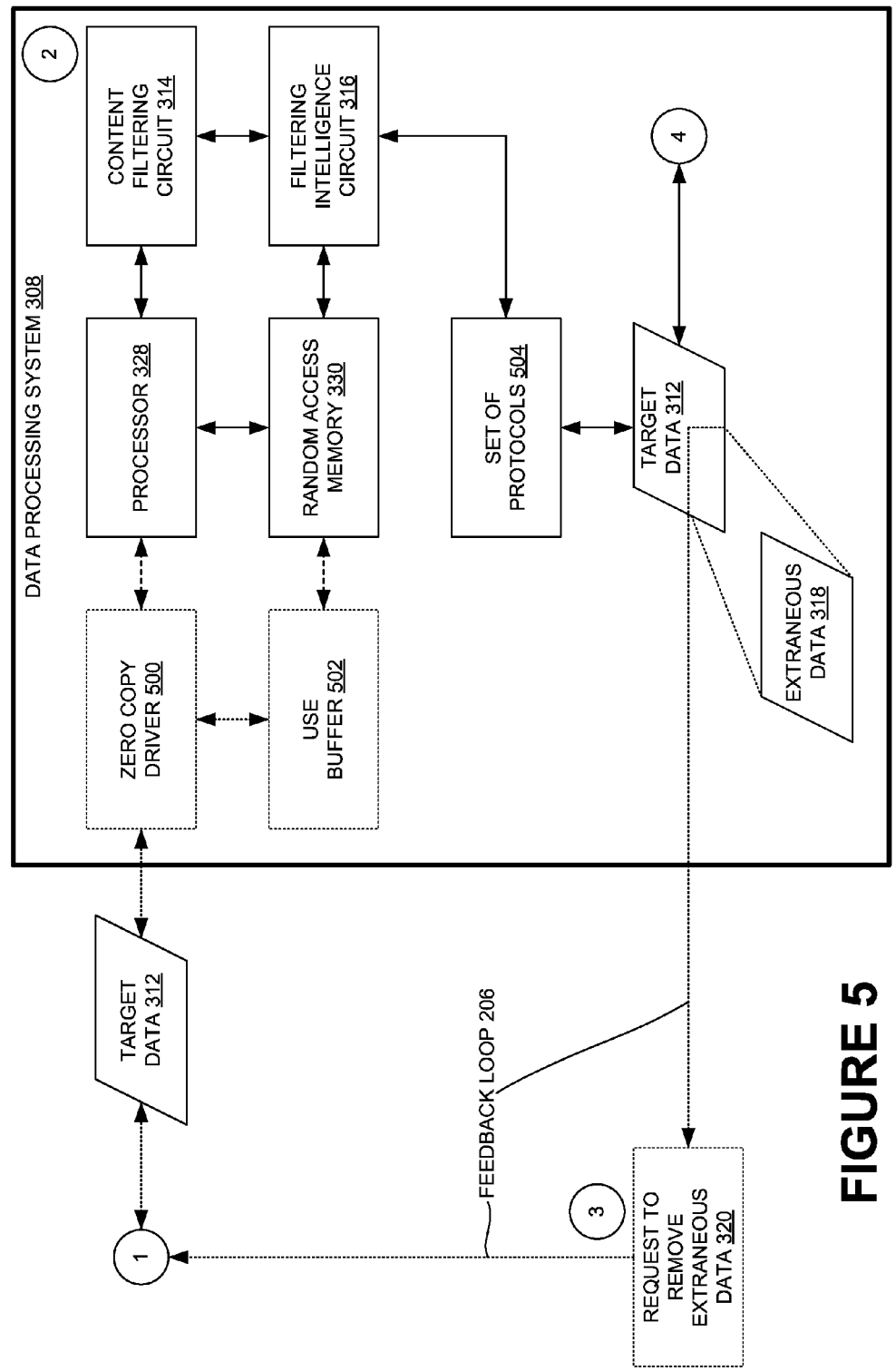
FIG. 5 is a functional block diagram of the data processing system 308 of FIG. 3 which buffers the target data 312 in a random access memory 334, classifies a set of protocols 504 associated with the target data 312, and communicates a request to remove extraneous data 320 to the first stage 202, according to one embodiment.

FIG. 5 is a functional block diagram of the data processing system 308 of FIG. 3 which buffers the target data 312 in a random access memory 330, classifies a set of protocols 504 associated with the target data 312, and communicates a request to remove extraneous data 320 to the first stage 202, according to one embodiment. In FIG. 5, a zero-copy driver 500 and a use buffer 502 may be associated with a processor 328 and a random access memory 330. The target data 312 may be buffered in the random access memory 330 and a set of protocols 504 may be produced based on the filtering intelligence circuit 316. A portion of the target data 312 may be an extraneous data 318 based on the set of protocols 504 produced by the filtering intelligence circuit 316.

In one embodiment, the method of a network traffic monitoring system 200 includes applying a zero-copy driver 500 and a use buffer 502 in the first stage 202 and/or the second stage 204 and reducing processing power and memory usage through the application of the zero-copy driver 500 and the use buffer 502 in the second stage 204. The method may involve buffering the target data 312 in a random access memory 330 in the second stage 204. The method may further involve classifying a set of protocols 504 associated with the target data 312 in the second stage 204 and applying the filtering intelligence algorithm implemented by a filtering intelligence circuit 316 to extract the extraneous data 318 from the target data 312 in the second stage 204. Furthermore, the method may further involve determining a communication mode between the second stage 204 and the dynamic filtering operation of the first stage 202 so that a request to remove the extraneous data 320 based on the filtering intelligence algorithm implemented by a filtering intelligence circuit 316 of the second stage 204 is executable.

In another embodiment, the data processing system 308 includes applying a zero-copy driver 500 and a use buffer 502 in the data processing system 308 and reducing processing power and memory usage in the data processing system 308. The data processing system 308 may include buffering the target data 312 in a random access memory 330. The data processing system 308 may also include classifying a set of protocols 504 associated with the target data 312 and applying the filtering intelligence algorithm implemented by a filtering intelligence circuit 316 to extract the extraneous data 318 from the target data 312. Furthermore, the data processing system 308 may also involve determining a communication mode between the data processing system 308 and the dynamic filtering operation of the first stage 202 so that a request to remove the extraneous data 320 based on the filtering intelligence algorithm implemented by a filtering intelligence circuit 316 of the data processing system 308 is executable.

In yet another embodiment, the method of a network traffic monitoring system 200 includes applying a zero-copy driver 500 and a use buffer 502 in the data processing system 308 and reducing processing power and memory usage through the application of the zero-copy driver 500 and the use buffer 502 in the data processing system 308. The method may also include buffering the target data 312 in a random access memory 330 in the data processing system 308. The method may further include classifying a set of protocols 504 associated with the target data 312 in the data processing system 308 and applying the filtering intelligence algorithm implemented by a filtering intelligence circuit 316 to extract the extraneous data 318 from the target data 312 in the data processing system 308. Furthermore, the method may also include determining a communication mode between the data processing system 308 and the dynamic filtering operation of the first stage module 306 so that a request to remove the extraneous data 320 based on the filtering intelligence algorithm implemented by a filtering intelligence circuit 316 of the data processing system 308 is executable.

Figure 6:
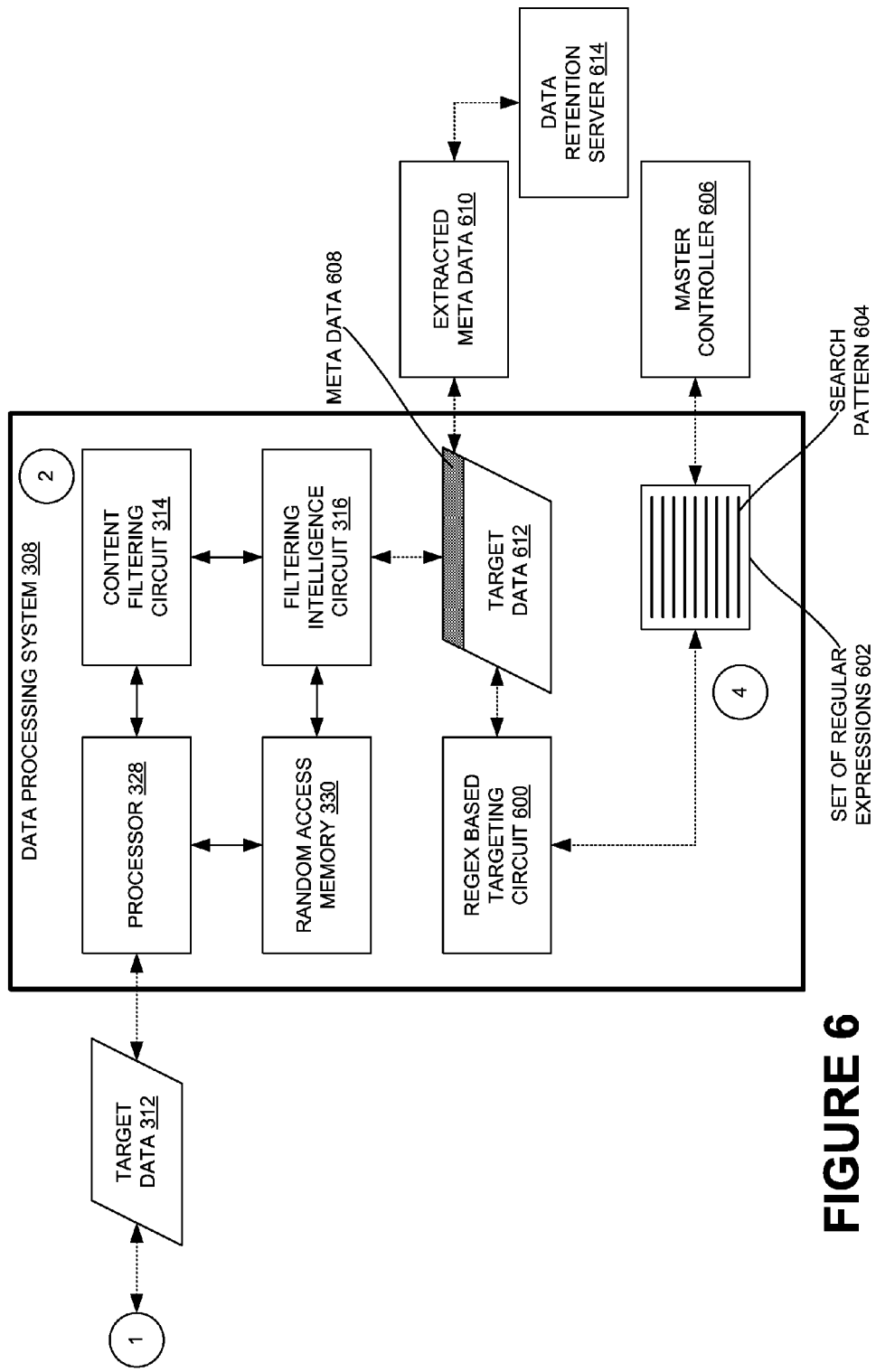
FIG. 6 is a schematic view of the data processing system 308 of FIG. 3 reporting a search pattern 604 to a master controller 606 and an extracted meta data 608 of the target data 612 to a data retention server 610, according to one embodiment.

FIG. 6 is a schematic view of the data processing system 308 of FIG. 3 reporting a search pattern 604 to a master controller 606 and an extracted meta data 610 of the target data 612 to a data retention server 614, according to one embodiment. In FIG. 6, a regex based targeting circuit 600 may be applied to a target data 612 of the data processing system 308 to produce a set of regular expressions 602 describing a search pattern 604. The set of regular expressions 602 may be communicated to a master controller 606. Furthermore, a meta data 608 associated with the target data 612 may be extracted. The extracted meta data 610 may be communicated to a data retention server 614.

In one embodiment, the method of a network traffic monitoring system 200 may include applying a regex based targeting algorithm, implemented through a regex based targeting circuit 600, to a target data 612 in the second stage 204 to produce a set of regular expressions 602 describing a search pattern 604. The method may also involve communicating the set of regular expressions 602 to a master controller 606. The method may further involve extracting a meta data 608 associated with the target data 612 in the second stage 204 and communicating the extracted meta data 610 to a data retention server 614.

In another embodiment, the method may involve applying a regex based targeting algorithm, implemented by a regex based targeting circuit 600, to the target data 612 in the data processing system 308 to produce a set of regular expressions 602 describing a search pattern 604. The method may also involve communicating the set of regular expressions 602 to a master controller 606. The method may further involve extracting a meta data 608 associated with the target data 612 in the data processing system 308 and communicating the extracted meta data 610 to a data retention server 614.

In yet another embodiment, the method of a network traffic monitoring system 200 may also include extracting a meta data 608 associated with the target data 612 in the data processing system 308, communicating the extracted meta data 610 to a data retention server 614, applying a regex based targeting algorithm implemented by a regex based targeting circuit 600 to the target data 612 in the data processing system 308 to produce a set of regular expressions 602 describing a search pattern 604, and communicating the set of regular expressions 602 to a master controller 606.

Figure 7:
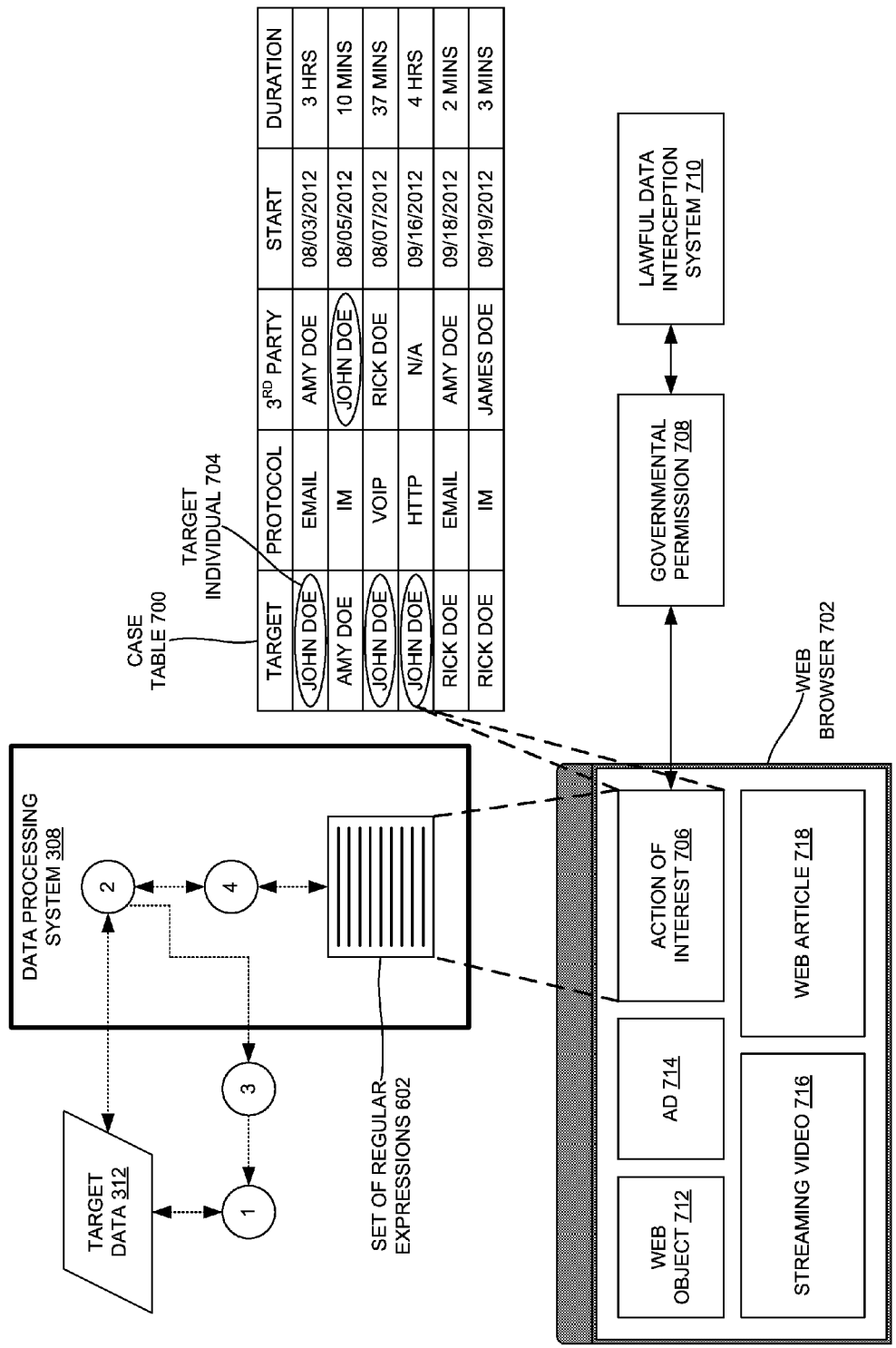
FIG. 7 is a table view illustrating a governmental permission 708 accessed through a lawful data interception system 710 to capture the target data 612 of FIG. 6 associated with an action of interest 706, according to one embodiment.

FIG. 7 is a table view illustrating a governmental permission 708 accessed through a lawful data interception system 710 to capture the target data 312 of FIG. 3 associated with an action of interest 706, according to one embodiment. In FIG. 7, a case table 700 and a web browser 702 may share an action of interest 706 associated with the set of regular expressions 602 of FIG. 6 and a target individual 704. The web browser 702 may also include a web object 712, an ad 714, a streaming video 716 and/or a web article 718.

In one embodiment, the method of a network traffic monitoring system 200 includes analyzing the target data 612 to discover an action of interest 706 in the set of regular expressions 602 associated with a target individual 704 in the second stage 204. The action of interest 706 may be subject to a governmental permission 708 as to how the action of interest 706 is usable in a lawful data interception system 710.

In another embodiment, the data processing system 308 includes analyzing the target data 612 to discover an action of interest 706 in the set of regular expressions 602 associated with a target individual 704 in the data processing system 308.

In yet another embodiment, the method of a network traffic monitoring system 200 includes analyzing the target data 612 to discover an action of interest 706 in the set of regular expressions 602 associated with a target individual 704 in the data processing system 308. The action of interest 706 may be subject to a governmental permission 708 as to how the action of interest 706 is usable in a lawful data interception system 710.

Figure 8:
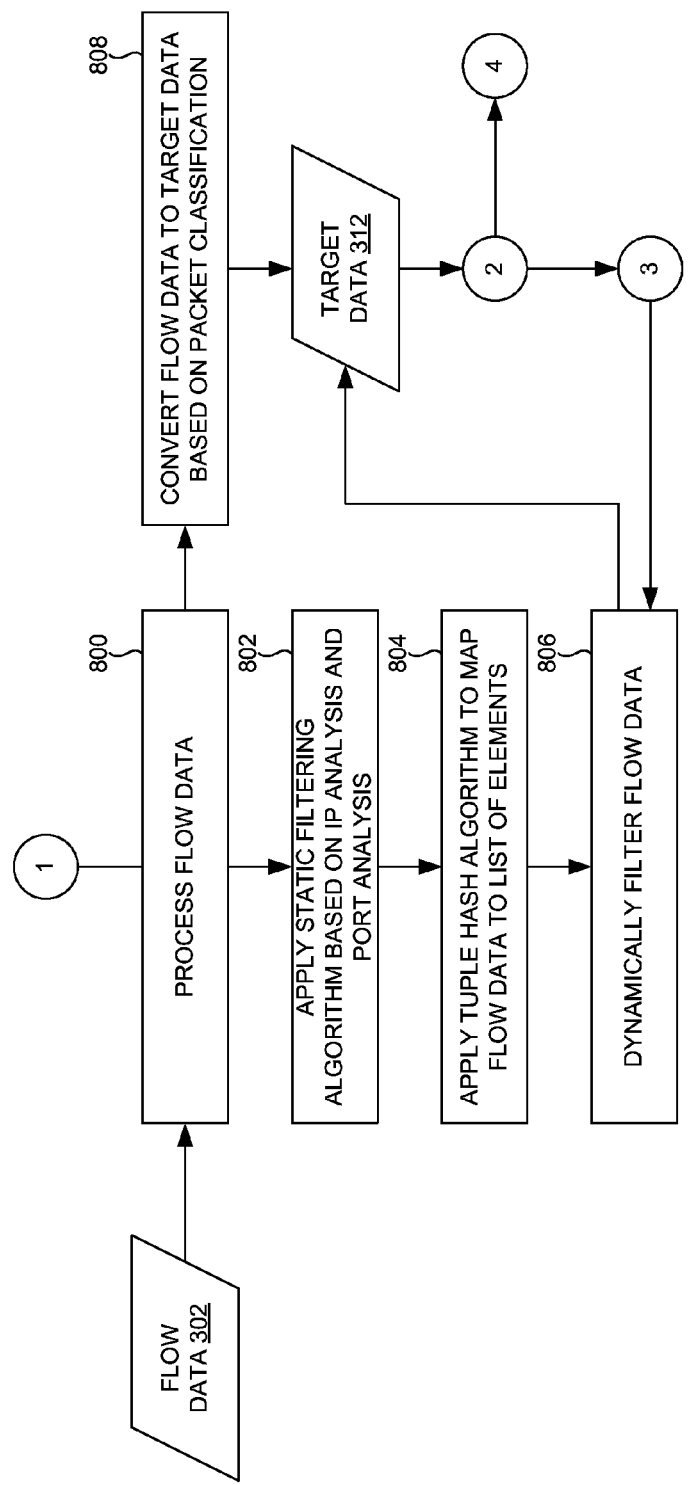
FIG. 8 is a process flow chart of a method of the first stage module 202 of FIG. 2 for converting the flow data 302 to the target data 312, according to one embodiment.

FIG. 8 is a process flow chart of a method of the first stage module 306 of FIG. 2 for converting the flow data 302 to the target data 312, according to one embodiment. In operation 800, a flow data 302 is processed by an aggregation switch 304. In operation 802, a static filtering algorithm implemented by a static filtering module 322 is applied to the flow data 302 based on an internet protocol analysis performed by a IP analysis module 402 and a port analysis performed by a port analysis module 400. In operation 804, a tuple hash algorithm implemented by a tuple hash module 324 is applied to the flow data 302 to map the flow data 302 to an ordered list of elements 404. In operation 806, the flow data 302 is dynamically filtered by a dynamic filtering module 326. In operation 808, the flow data 302 is converted to a target data 312 based on a packet classification performed by a packet classification module 310.

Figure 9:
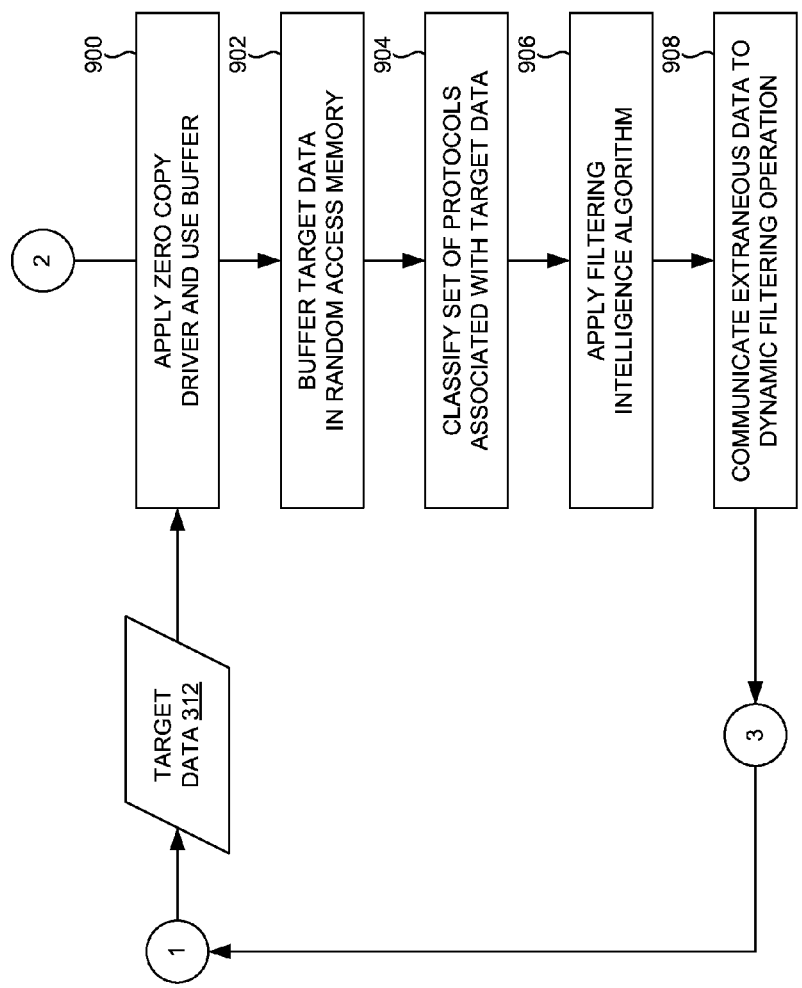
FIG. 9 is a process flow chart, continued from FIG. 8, of a method of the data processing system 308 of FIG. 3 for determining a portion of extraneous data 318 and communicating the extraneous data 318 to the first stage 202, according to one embodiment.

FIG. 9 is a process flow chart, continued from FIG. 8, of a method of the data processing system 308 of FIG. 3 to determine a portion of extraneous data 318 and communicating the extraneous data 318 to the first stage 202, according to one embodiment. In operation 900, a zero-copy driver 500 and a use buffer 502 is applied to the target data 312. In operation 902, the target data 312 is buffered in a random access memory 330. In operation 904, a set of protocols 504 associated with the target data 312 is classified. In operation 906, a filtering intelligence algorithm is applied to the target data 312 through a filtering intelligence circuit 316. In operation 908, a portion of an extraneous data 318 of the target data 312 is communicated to the dynamic filtering module 326.

Figure 10:
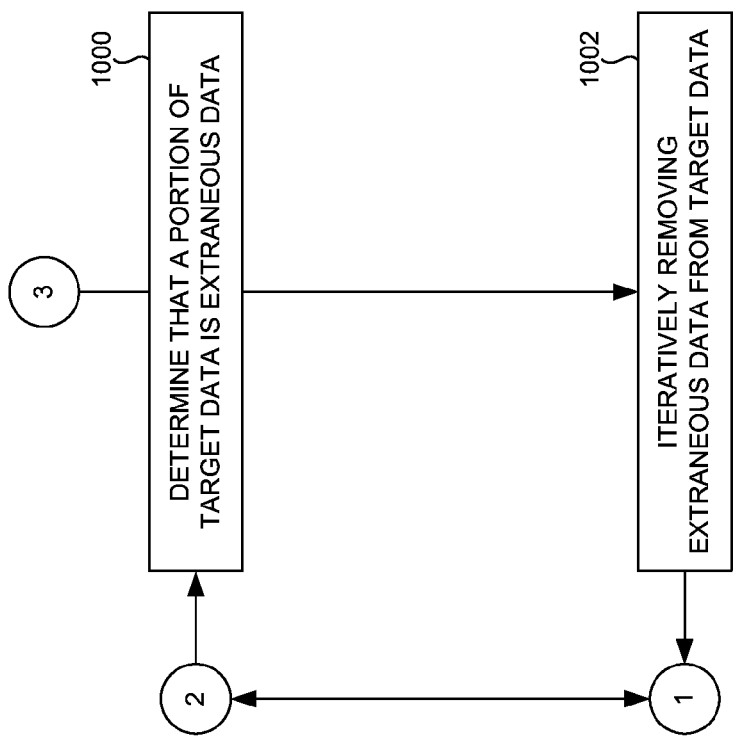
FIG. 10 is a process flow chart, continued from FIG. 9, of a method of a feedback loop 206 of FIG. 2 to iteratively remove a portion of extraneous data from the target data 312, according to one embodiment.

FIG. 10 is a process flow chart, continued from FIG. 9, of a method of a feedback loop 206 of FIG. 2 to iteratively remove a portion of extraneous data 318 from the target data 312, according to one embodiment. In operation 1000, a portion of an extraneous data 318 of the target data 312 is determined. In operation 1002, the extraneous data 318 is iteratively removed from the target data 312 through a feedback loop 206 between the data processing system 308 and the dynamic filtering module 326 of the first stage module 306.

Figure 11:
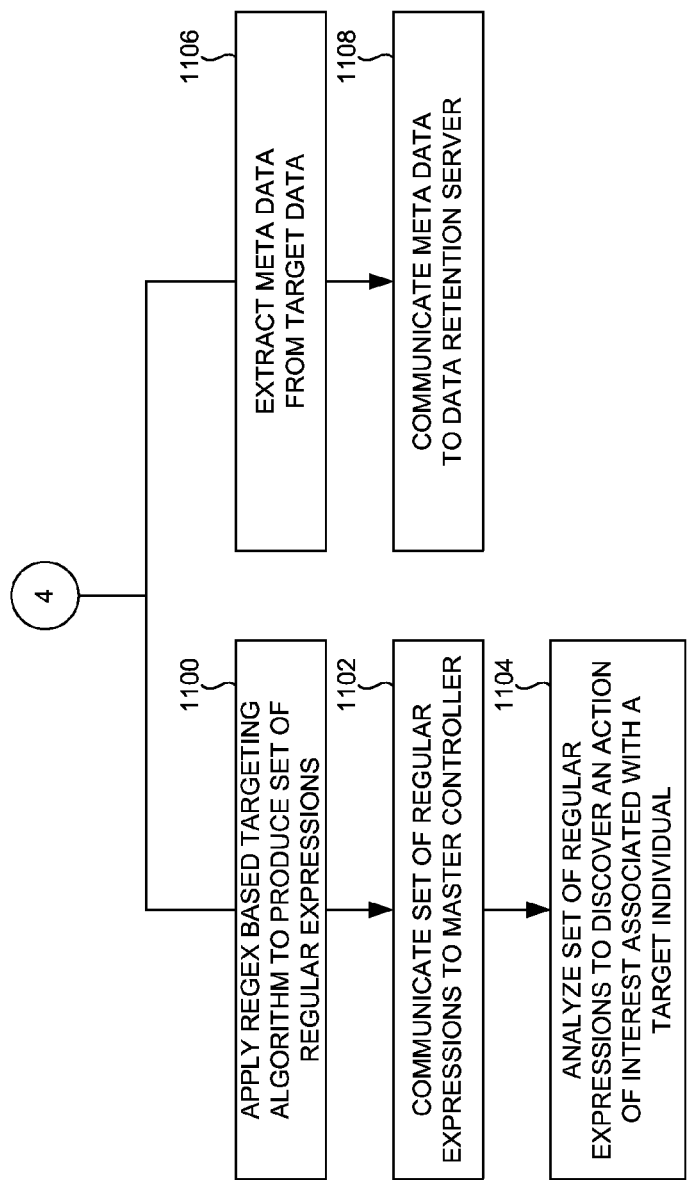
FIG. 11 is a process flow chart, continued from FIG. 10, of reporting the action of interest 706 associated with the target individual 704 of FIG. 7 derived from the target data 612 to a master controller 606 and communicating the extracted meta data 610 to a data retention server 614, according to one embodiment.

FIG. 11 is a process flow chart, continued from FIG. 10, of reporting the action of interest 706 associated with the target individual 704 of FIG. 7 derived from the target data 612 to a master controller 606 and communicating the extracted meta data 610 to a data retention server 614, according to one embodiment. In operation 1100, a regex based targeting algorithm, implemented by a regex based targeting circuit 600 is applied to the target data 612 to produce a set of regular expressions 602. In operation 1102, the set of regular expressions 602 is communicated to a master controller 606. In operation 1104, the set of regular expressions 602 is analyzed to discover an action of interest 706 associated with a target individual 704. In operation 1106, a meta data 608 associated with the target data 612 is extracted. In operation 1108, an extracted meta data 610 associated with the target data 612 is communicated to a data retention server 614.

An example will now be described in which the various embodiments will be explained in a hypothetical scenario. A government security team named 'XYZ, Inc.' may wish to utilize a software program on standard commodity hardware to monitor a network named 'XYZ Net' for cybercrime activities. XYZ, Inc. may prefer to use software instead of hardware since software is cheaper to maintain, easier to upgrade, and can be flexible in the way it manipulates data. However, processing data in software may be slower than in hardware. As such XYZ, Inc. may wish to reduce the inflow of network data to 1) enable the use of software instead of expensive custom hardware, and 2) maximize efficiency and minimize redundancies in monitoring data. More specifically, XYZ, Inc. may wish to filter the network data to focus on specific web activities associated with individuals engaging in illegal activity.

Any data entering the XYZ Net network may be classified according to the threat level of the web activities involved with the incoming data. To reduce the amount of data to monitor, XYZ, Inc. may wish to develop a way for the software and the hardware to communicate for the purpose of ignoring certain sources of data, e.g., a web object 712, ads 714, streaming video 716, or a web article 718, all of which can be found in a web browser 702. XYZ, Inc. may wish to ignore this innocuous data in order to focus on actions of interest 706 associating a target individual 704 with an illegal activity.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative in rather than a restrictive sense.

What is claimed is:

1. A non-transitory medium, readable through a network traffic monitoring system used by a data interception system and comprising instructions embodied therein that are executable through the network traffic monitoring system, comprising:
   instructions to process flow data from a computer network received through an aggregation switch of the network traffic monitoring system in a first stage module of the network traffic monitoring system;
   instructions to identify target network activities of interest to the data interception system;
   instructions to filter the flow data to target data based on packet classification in the first stage module, the target data being associated with the identified target network activities of interest to the data interception system;

instructions to determine that a portion of the target data is extraneous data in a data processing system of the network traffic monitoring system based on classifying the target data according to an analysis of protocols associated therewith through a hardware component of the data processing system, the extraneous data being the portion of the target data that is determined to be: irrelevant in the network traffic monitoring system used by the data interception system and innocuous with respect to a threat level thereof based on the classification of the target data, and the data processing system being commodity hardware in a second stage of the network traffic monitoring system communicatively coupled to the first stage module;

instructions to extract metadata associated with the target data in the data processing system;

instructions to produce, through the data processing system, a set of regular expressions describing a search pattern in the target data;

instructions to analyze the target data to discover an action of interest in the set of regular expressions associated with a target individual in the data processing system, the action of interest corresponding to an identified target network activity of interest; and instructions to utilize, through the data processing system, instructions to monitor the computer network for specific network activities of interest to the data interception system, the instructions to monitor the computer network for the specific network activities of interest comprising instructions to iteratively remove from the target data the extraneous data based on creating a feedback loop between the data processing system and the first stage module of the network traffic monitoring system, the feedback loop being a control system configured to adjust operation thereof between an actual output and a desired output of the data processing system, and the feedback loop involving a modification in data processing through the first stage module to effect the desired output of the data processing system.

2. The non-transitory medium of claim 1, further comprising:

instructions to apply a zero-copy driver and a use buffer in at least one of the first stage module and the data processing system; and instructions to reduce processing power and memory usage through the application of the zero-copy driver and the use buffer in the data processing system.

3. The non-transitory medium of claim 1, further comprising:

instructions to communicate the extraneous portion of the target data from the data processing system to the first stage module following the content filtering.

4. The non-transitory medium of claim 1, wherein the instructions to determine that the portion of the target data is the extraneous data further comprises at least one of:

instructions to perform static filtering of the flow data based on an internet protocol analysis and a port analysis in the first stage module;

instructions to map the flow data having a variable length into an ordered list of elements having a fixed length of the flow data in the first stage module; and instructions to dynamically filter the flow data in the first stage module based on the removal of the extraneous data communicated from the data processing system.

5. The non-transitory medium of claim 4, further comprising at least one of:

instructions to buffer the target data in a random access memory in the data processing system; and instructions to determine a communication mode between the data processing system and the dynamic filtering of the first stage module so that a request to remove the extraneous data is executable.

6. The non-transitory medium of claim 1, further comprising:

instructions to communicate the extracted metadata to a data retention server; and instructions to communicate the set of regular expressions to a master controller.

7. The non-transitory medium of claim 6, wherein the action of interest is subject to a governmental permission as to how the action of interest is usable in the data interception system.

8. A network traffic monitoring system used by a data interception system comprising:

an aggregation switch to consolidate flow data from a computer network;

a processing module to identify target network activities of interest to the data interception system;

a first stage module to filter the flow data to target data based on packet classification therein, the target data being associated with the identified target network activities of interest to the data interception system; and a data processing system comprising a processor and a memory to determine that a portion of the target data is extraneous data based on classifying the target data according to an analysis of protocols associated therewith through a hardware component of the data processing system, to utilize instructions to monitor the computer network for specific network activities of interest to the data interception system, to extract metadata associated with the target data, to produce a set of regular expressions describing a search pattern in the target data, to analyze the target data to discover an action of interest corresponding to an identified target network activity of interest in the set of regular expressions associated with a target individual in the data processing system, and to iteratively remove from the target data the extraneous data based on forming a feedback loop between the data processing system and the first stage module, the extraneous data being the portion of the target data that is determined to be: irrelevant in the network traffic monitoring system used by the data interception system and innocuous with respect to a threat level thereof based on the classification of the target data, and the data processing system being commodity hardware in a second stage of the network traffic monitoring system communicatively coupled to the first stage module, wherein the feedback loop is a control system configured to adjust operation thereof between an actual output and a desired output of the data processing system, the feedback loop involving a modification in data processing through the first stage module to effect the desired output of the data processing system.

9. The network traffic monitoring system of claim 8, wherein the first stage module is further configured to at least one of:

perform static filtering of the flow data based on an internet protocol analysis and a port analysis, map the flow data having a variable length into an ordered list of elements having a fixed length of the flow data, and dynamically filter the flow data based on the removal of the extraneous data communicated from the data processing system.

10. The network traffic monitoring system of claim 9, wherein the data processing system is further configured to at least one of:
apply a zero-copy driver and a use buffer,
reduce processing power and memory usage through the application of the zero-copy driver and the use buffer,
buffer the target data in a random access memory, and
determine a communication mode between the data processing system and the dynamic filtering of the first stage module so that a request to remove the extraneous data is executable.

11. The network traffic monitoring system of claim 8, wherein the data processing system is further configured to at least one of:
communicate the extracted metadata to a data retention server, and
communicate the set of regular expressions to a master controller.

12. The network traffic monitoring system of claim 11, wherein
the action of interest is subject to a governmental permission as to how the action of interest is usable in the data interception system.

13. A method of a network traffic monitoring system used by a data interception system comprising:
processing flow data from a computer network received through an aggregation switch of the network traffic monitoring system in a first stage module of the network traffic monitoring system;
identifying target network activities of interest to the data interception system;
filtering the flow data to target data based on packet classification in the first stage module, the target data being associated with the identified target network activities of interest to the data interception system;
determining that a portion of the target data is extraneous data in a data processing system of the network traffic monitoring system based on classifying the target data according to an analysis of protocols associated therewith through a hardware component of the data processing system, the extraneous data being the portion of the target data that is determined to be: irrelevant in the network traffic monitoring system used by the data interception system and innocuous with respect to a threat level thereof based on the classification of the target data, and the data processing system being commodity hardware in a second stage of the network traffic monitoring system communicatively coupled to the first stage module;
extracting metadata associated with the target data in the data processing system;
producing, through the data processing system, a set of regular expressions describing a search pattern in the target data;
analyzing the target data to discover an action of interest in the set of regular expressions associated with a target individual in the data processing system, the action of interest corresponding to an identified target network activity of interest; and
utilizing, through the data processing system, instructions to monitor the computer network for specific network activities of interest to the data interception system, the monitoring of the computer network for the specific network activities of interest comprising iteratively removing from the target data the extraneous data based on creating a feedback loop between the data processing system and the first stage module of the network traffic monitoring system, the feedback loop being a control system configured to adjust operation thereof between an actual output and a desired output of the data processing system, and the feedback loop involving a modification in data processing through the first stage module to effect the desired output of the data processing system.

14. The method of claim 13, further comprising:
communicating the extraneous portion of the target data from the data processing system to the first stage module following the content filtering.

15. The method of claim 13, further comprising:
performing static filtering of the flow data based on an internet protocol analysis and a port analysis in the first stage module;
mapping the flow data having a variable length into an ordered list of elements having a fixed length of the flow data in the first stage module; and
dynamically filtering the flow data in the first stage module based on the removal of the extraneous data communicated from the data processing system.

16. The method of claim 15, further comprising at least one of:
applying a zero-copy driver and a use buffer in the data processing system;
reducing processing power and memory usage through the application of the zero-copy driver and the use buffer in the data processing system;
buffering the target data in a random access memory in the data processing system; and
determining a communication mode between the data processing system and the dynamic filtering of the first stage module so that a request to remove the extraneous data is executable.

17. The method of claim 13, further comprising at least one of:
communicating the extracted metadata to a data retention server; and
communicating the set of regular expressions to a master controller.

18. The method of claim 17,
wherein the action of interest is subject to a governmental permission as to how the action of interest is usable in the data interception system.

* * * * *